United States Patent
Foster, Sr. et al.

(10) Patent No.: US 6,339,806 B1
(45) Date of Patent: Jan. 15, 2002

(54) PRIMARY BUS TO SECONDARY BUS MULTIPLEXING FOR I²C AND OTHER SERIAL BUSES

(75) Inventors: Jimmy Grant Foster, Sr., Chapel Hill; Justin Potok Bandholz, Apex; Richard Jesse Muse, Wake Forest, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/273,663

(22) Filed: Mar. 23, 1999

(51) Int. Cl.⁷ .......................... G06F 13/00; G06F 13/38
(52) U.S. Cl. .................. 710/131; 710/101; 710/110; 710/126; 710/128; 710/129; 713/401
(58) Field of Search ................................ 710/101, 110, 710/126, 128, 129, 131; 713/400, 401

(56) References Cited

U.S. PATENT DOCUMENTS

| | | | | |
|---|---|---|---|---|
| 5,604,918 A | * | 2/1997 | Huijsing et al. | 710/72 |
| 5,696,994 A | * | 12/1997 | Pang | 710/64 |
| 6,145,102 A | * | 11/2000 | Klein et al. | 714/47 |
| 6,233,635 B1 | * | 5/2001 | Son | 710/126 |
| 6,286,073 B1 | * | 9/2001 | Vegter | 710/129 |

* cited by examiner

Primary Examiner—Rupal Dharia
(74) Attorney, Agent, or Firm—Martin J. McKinley

(57) ABSTRACT

A computer or other electronic system includes a primary I²C bus and a plurality of secondary I²C buses that can be selectively coupled to the primary bus. The primary I²C bus is coupled to the input of an I/O expander, which has a unique address on the primary bus, and to the bus input of a bus switch. Each of the secondary I²C buses is coupled to a unique one of the bus outputs of the bus switch, which are controlled by a plurality on control inputs. Activating a selected control input of the bus switch couples the primary I²C bus to the corresponding secondary I²C bus. A controller addresses the I/O expander and then transmits a unique data byte that activates a selected output of the expander. Each of the outputs of the I/O expander is coupled to a unique control input of the bus switch through a delay circuit. The delay circuit delays the activation of the corresponding control input of the bus switch until after an acknowledge bit and a stop bit have been communicated over the primary I²C bus, so that the switching from one secondary bus to another occurs at the appropriate time.

6 Claims, 2 Drawing Sheets

PRIMARY BUS TO SECONDARY BUS MULTIPLEXING FOR I²C AND OTHER SERIAL BUSES

BACKGROUND OF THE INVENTION

This invention pertains to computers and other electronic systems and, more particularly, to such a system that includes a primary serial bus and a plurality of secondary serial buses, and means for coupling the primary serial bus to a selected secondary serial bus.

The Inter-Integrated Circuit or "I²C" bus is a well known industry standard serial bus for interconnecting and transferring information between various integrated circuits or "chips" in a computer or other electronic system. The standard I²C bus includes two lines, an "SDA" line for transmitting start, address, data, control, acknowledge and stop information, and an "SCL" line that carries the clock.

Briefly, a bus master transmits a start bit followed by 8 bits of address and read/write information. The start bit is unique in that the SDA line transitions from high to low while the SCL line is high. The only other time the SDA line transitions when the clock line is high is during a stop bit, which is a low to high transition of the SDA line when SCL is high. The next 8 bits include 7 address bits and 1 read/write bit. Of the 7 address bits, 4 of these bits are preprogrammed by the chip manufacturer and the remaining 3 bits are typically programmed by the system manufacturer, typically through three inputs on the chip that can be pulled up or down as required. Consequently, because the chip manufacturer pre-programs the most significant 4 bits of a 7 bit address, leaving only 3 programmable address bits for the system manufacturer, a computer or other electronic system is usually limited to having a maximum of $2^3$ or 8 of the same type of chip connected to any one I²C bus.

Following the transmission of the address and read/write bits, the addressed slave responds with and "ACK" or acknowledge bit. Next, the master transmits 8 bits of data, which is again followed by the transmission of an ACK from the slave. This pattern of 8 data bits followed by an ACK bit can be repeated until all data has been transmitted, or it can be terminated only after one byte of data is transmitted by the transmission of a stop bit following the data acknowledge bit from the slave.

Bus loading is a limitation as to the total number of devices that can be coupled to any one bus. Consequently, because of bus loading, and because of the inability to address more than 8 of the same type of chip on any one I²C bus, system manufacturers have previously incorporated more than one I²C bus in a system, and they have used two general approaches to interconnecting multiple I²C buses.

The first approach is to use multiple primary I²C buses, each with its own controller.

The first approach solves the limitations of loading and address availability, but requires extra controllers, which are usually the most expensive device in an I²C circuit. In addition, the requirement of running a number of primary I²C buses through many connectors and interfaces adds cost and, in some cases, is not possible because of the limited pin count of the connectors and interfaces.

The second approach is to use a primary I²C bus multiplexed onto two or more secondary I²C buses, but controlled separately from any of the secondary buses. The second approach is an improvement over the first in that it does not require multiple controllers and it is not constrained to run through multiple connectors and interfaces. However, a new complexity arises in that a separate mechanism must be set up to control the multiplexing. Since the primary I²C bus is switched in this approach, it must be controlled from a different primary I²C bus; otherwise data loss and signal quality degradation will occur. Consequently, the need for more than one primary I²C bus limits the benefits of this approach.

Accordingly, the invention described below has all the benefits of the approaches described above, but without any of the aforementioned limitations. In particular, this invention can generate new addresses for each of the secondary serial buses, but it does not require more than one controller or more than one primary serial bus.

SUMMARY OF THE INVENTION

Briefly, the invention is an electronic system that includes a primary I²C bus for communicating start bits, address bits, data bits, acknowledgment bits and stop bits over an SDA line of the primary I²C bus, wherein a block of data bits is followed by an acknowledgment bit and a stop bit. The system also includes a plurality of secondary I²C buses and an expander with a unique I²C address. The expander includes a bus port coupled to the primary I²C bus, and a plurality of outputs that can be selectively activated. A controller is coupled to the primary I²C bus. The controller can activate a selected one of the outputs of the expander by transmitting the unique I²C address to the bus port of the expander, followed by the transmission of a predetermined block of data bits. A bus switch includes a bus input coupled to the primary I²C bus and a plurality of bus outputs, wherein each of the of secondary I²C buses is coupled to a unique one of the bus outputs. The bus switch also includes a plurality of control inputs, such that the primary I²C bus can be connected to a unique one of the secondary I²C buses in response to the activation of the corresponding control input. A plurality of delay circuits, each one coupled between a unique one of the outputs of the expander and a unique one of the control inputs of the bus switch, delays the activation of the corresponding control input of the bus switch until after an acknowledgment bit and a stop bit have been communicated over the primary I²C bus.

In another embodiment, the invention is an electronic system including a primary serial bus for communicating address bits, data bits and control bits over an information line of the primary serial bus, wherein a block of data bits is followed by a control bit. The system also includes a plurality of secondary serial buses, and an expander with a unique address. The expander includes a bus port coupled to the primary serial bus, and a plurality of outputs that can be selectively activated. A controller is coupled to the primary serial bus. The controller selectively activates a selected one of the outputs of the expander by transmitting the unique address to the bus port of the expander, followed by the transmission of a predetermined block of data bits. A bus switch includes a bus input coupled to the primary serial bus and a plurality of bus outputs, wherein each of the secondary serial buses is coupled to a unique one of the bus outputs. The bus switch also includes a plurality of control inputs, such that the primary serial bus can be connected to a unique one of the secondary serial buses in response to the activation of the corresponding control input. A plurality of delay circuits, each one coupled between a unique one of the outputs of the expander and a unique one of the control inputs of the bus switch, delays the activation of the corresponding control input of the bus switch until after a control bit has been communicated over the primary serial bus.

DESCRIPTION OF THE ILLUSTRATIVE EMBODIMENT

Figure 1:
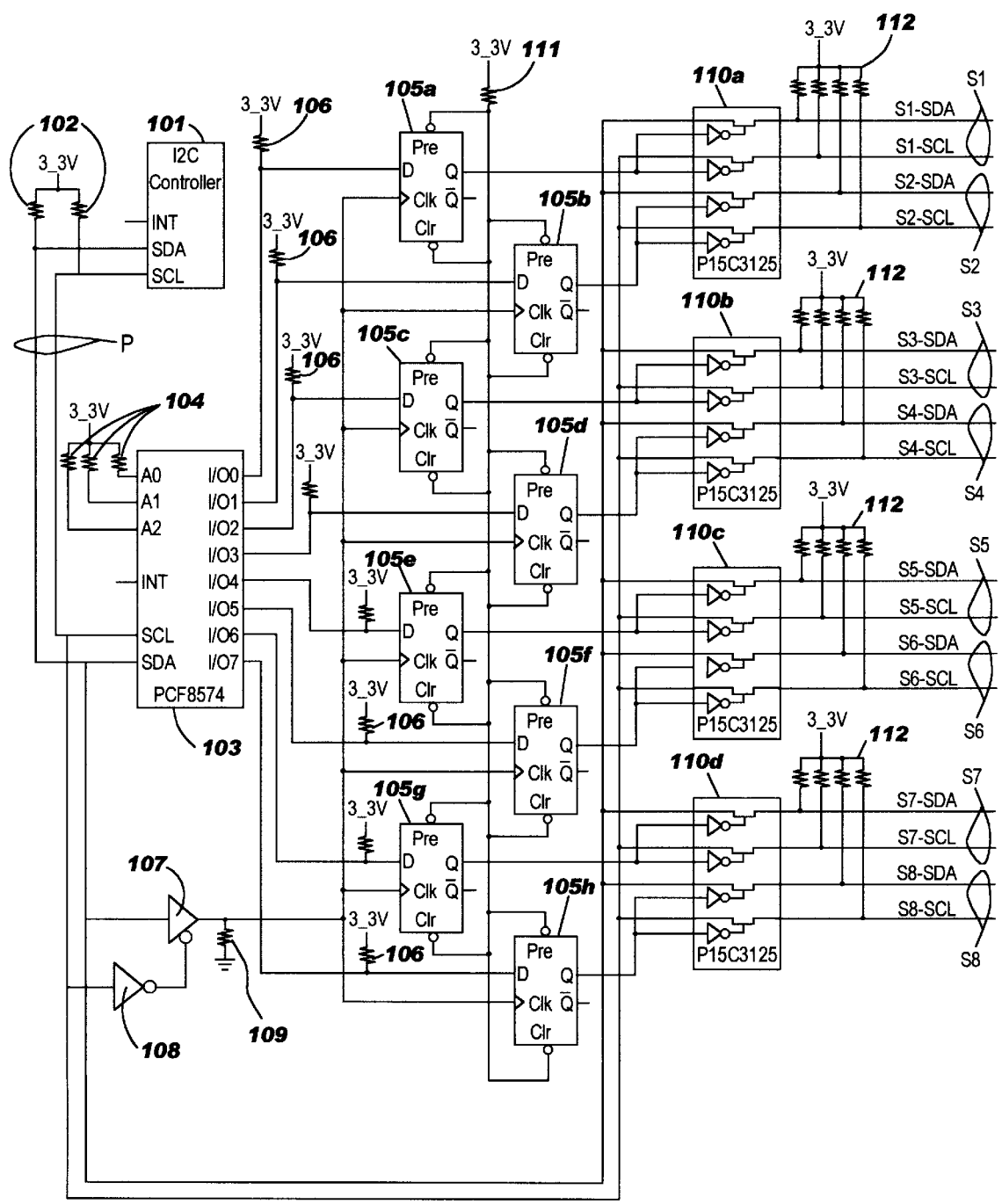
FIG. 1 is a schematic diagram of the present invention.

FIG. 1 is a block diagram of an illustrative embodiment of the current invention. Referring to this figure, controller 101 is a well known I²C bus controller having its SDA and SCL ports connected to, respectively, the PSDA ("Primary SDA") and PSCL ("Primary SCL") lines of a primary I²C bus P. Two pull-up resistors, collectively labeled 102 in FIG. 1, pull the PSDA and PSCL lines high. The SDA and SCL ports of a well known I/O expander, such as a Philips PCF8574, are connected, respectively, to the PSDA and PSCL lines of primary I²C bus P. The A0, A1 and A2 inputs of expander 103 are connected through three resistors, collectively labeled 104 in FIG. 1, to either V+ or ground (in FIG. 1, all three resistors are connected to V+) to set the lower order address bits of I/O expander 103. As discussed above, the 4 high order address bits are preset by the chip manufacturer and are not programmable to the system designer. Thus, I/O expander 103, like other I²C bus devices, responds to a 7 bit address directed to the expander over the primary I²C bus P, with the 3 least significant bits being set by the system manufacturer and the 4 most significant address bits being pre-programmed by the chip manufacturer.

Outputs $I/O_0$ through $I/O_7$ of expander 103 are connected, respectively, to the "D" inputs of well known D-flip flops 105a through 105h. Eight pull-up resistors, collectively labeled 106 in FIG. 1, are connected to the $I/O_0$ through $I/O_7$ lines of expander 103. A pull-up resistor 111 is connected to the preset ("pre") and clear ("clr") inputs of D-flip flops 105a through 105h. The PSCL line of primary I²C bus P is connected to the input of a well known buffer 107, the output of which is connected to each of the CLK or clock inputs of D-flip flops 105a through 105h. Resistor 109 is connected between the output of buffer 107 and ground. The PSDA line of primary I²C bus P is connected to the input of a well known inverter 108, the output of which is connected to the enable input (active low) of buffer 107. The output of buffer 107 is the logical AND of PSDA and PSCL.

Four, well known, quad analog switches 110a through 110d, such as a Pericom PI5C3125, are used to selectively connect the primary I²C bus P to one of eight secondary I²C buses S1 through S8. Each secondary I²C bus S1 through S8 includes an SCL line and an SDA line, such as S1-SCL and S1-SDA of secondary I²bus S1. Each of the eight secondary SCL lines (S1-SCL through S8-SCL) is connected to a unique one of the outputs (which are bi-directional) of bus switches 110a through 110d, and the corresponding input is connected to the primary SCL line PSCL of primary I²C bus P. Similarly, each of the eight secondary SDA lines (S1-SDA through S8-SDA) is connected to a unique one of the outputs of bus switches 110a through 110d, and the corresponding input is connected to the primary SDA line PSDA of primary I²C bus P. Switches 110a through 110d include 16 enable inputs (the lines connected to the input of the inverters) which can be grouped in eight pairs, with each pair corresponding to a unique one of the eight secondary buses S1 through S8. Each pair of enable inputs is connected to a corresponding Q output of D-flip flops 105a through 105h. 16 pull-up resistors, collectively labeled 112 in FIG. 1, are connected to the SCL and SDA lines of each of the secondary buses S1 through S8.

The operation of selecting a particular secondary I²C bus S1 through S8 to be connected to the primary I²C bus P proceeds as follows. First, controller 101 transmits a start bit over primary I²C bus P, followed by the unique address of expander 103. Expander 103 responds by sending an acknowledgment bit or ACK over the bi-directional primary I²C bus P, which is received by controller 101. Next, controller 101 transmits a data byte over the primary I²C bus P, which is followed by another ACK from expander 103. For this process, the particular data byte transmitted by controller 101 includes seven logical 0's and one logic 1, the particular bit in the 8 bit byte that is set to logical 1 will cause the corresponding I/O output $I/O_0$ through $I/O_7$ of expander 103 to go active which, in turn, causes the corresponding "D" input of flip flops 105a through 105h to go active. With the D input of one of the flip flops active, the corresponding Q output of the flip flop will also go active on the next cycle of DCLK, which is connected to the "clk" inputs of each of the D-flip flops 105a through 105h. Thus, there is a slight delay between the Q outputs of flip flops 105a through 105h and the corresponding D inputs. When a particular Q output of a flip flop 105a through 105h goes active, it causes the corresponding pair of enable inputs of switches 110a through 110d to go active, thereby coupling the primary I²C bus to the selected secondary I²C bus.

Figure 2:
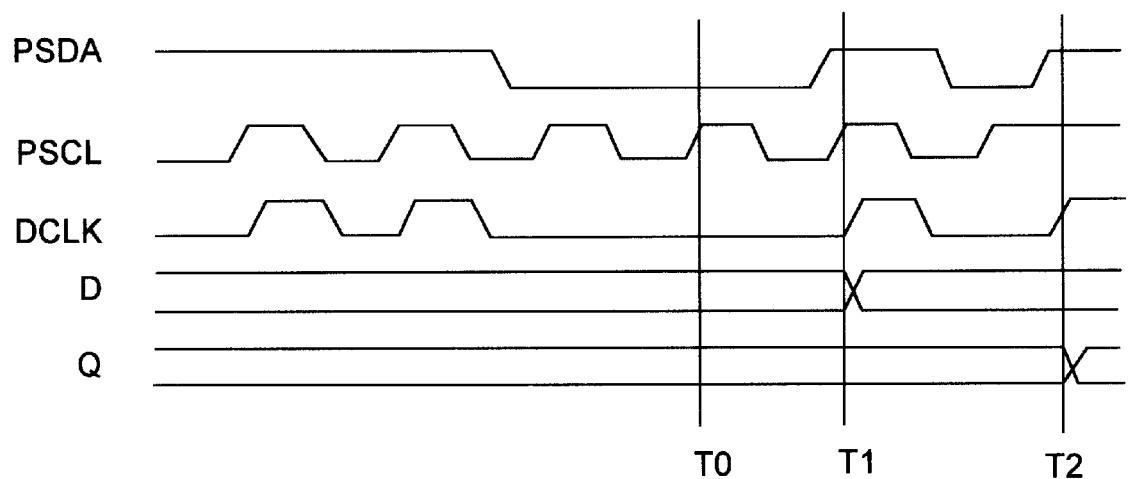
FIG. 2 is timing diagram that illustrates the operation of the present invention.

The timing of the delay between the D input and the Q outputs of flip flops 105a through 105h is critical, and is best illustrated by the timing diagram of FIG. 2. Referring to this figure, between times T0 to T1, expander 103 is transmitting an ACK bit back to controller 101, and the bits immediately preceding T0 are data bits transmitted by the controller. Recall that the particular data contained in the data byte determines which one of the secondary I²C buses will be selected for connection to the primary I²C bus P. Thus, at time T1, a selected one of the I/O outputs of expander 103 (as well as the D input of the corresponding flip flop 105a through 105h ) goes active as determined by the particular data transmitted immediately prior to time T0. (Similarly, if a different one of the I/O outputs of expander 103 was previously active, its output now goes inactive at time T0.) At time T2, PSDA goes active when clock line PSCL is active which, as described above, is indicative of a stop bit. The stop bit is recognized by buffer 107 and inverter 108, causing DCLK to go active upon detection of a stop bit. When DCLK goes active, it clocks the D input of flip flops 105a through 105h to the corresponding Q output and, if a Q output is active, it causes the corresponding pair of switches embodied in analog switches 110a through 110d to couple the primary I²C bus to a selected one of the secondary I²C buses S1 through S8.

Thus, D-flip flops 105a through 105h, as well as buffer 107 and inverter 108, form a delay circuit that delays the switching of the secondary buses S1 through S8 until both an acknowledgment bit ACK and a stop bit are transmitted over the primary I²C bus P. While a specific embodiment of the delay circuit is illustrated, those skilled in the art will recognize that there are other circuits that could perform substantially the same delay function. Similarly, other well known circuits could also be used to perform the expander and switching functions. Furthermore, this invention is not limited to the I²C bus, but is also applicable to other serial buses. While other serial buses may not transmit ACK and stop bits, the invention can be appropriately modified to delay the switching of the secondary buses until after the transmission of certain control bits that follow the transmission of data bits.

We claim as our invention:

1. An electronic system, comprising:
   a primary I²C bus for communicating start bits, address bits, data bits, acknowledgment bits and stop bits over an SDA line of said primary I²C bus, wherein a block of data bits is followed by an acknowledgment bit and a stop bit;

a plurality of secondary I²C buses;

an expander having a unique I²C address, said expander having a bus port coupled to said primary I²C bus, said expander including a plurality of outputs that can be selectively activated;

a controller coupled to said primary I²C bus, said controller activating a selected one of the outputs of said expander by transmitting said unique I²C address to the bus port of said expander, followed by the transmission of a predetermined block of data bits to the bus port of said expander;

a bus switch having a bus input coupled to said primary I²C bus and a plurality of bus outputs, each of said plurality of secondary I²C buses being coupled to a unique one of the bus outputs of said bus switch, said bus switch also having a plurality of control inputs, said primary I²C bus being connected to a unique one of said secondary I²C buses in response to a unique one of the control inputs being activated; and a plurality of delay circuits, each one of said delay circuits being coupled between a unique one of the outputs of said expander and a unique one of the control inputs of said bus switch, each one of said delay circuits delaying the activation of the corresponding control input of said bus switch until after an acknowledgment bit and a stop bit have been communicated over said primary I²C bus.

2. The electronic system of claim 1, wherein each of said delay circuits includes a "D" flip flop having an input and an output, the input of each flip flop coupled to a unique one of the outputs of said expander circuit, and the output of each of said "D" flip flops being coupled to a unique one of the control inputs of said bus switch.

3. The electronic system of claim 2, wherein:

each of said "D" flip flops includes a clock input;

said primary I²C bus also includes an SCL line; and said system including combinational logic for logically ANDing said SCL and SDA lines, the output of said combinational logic being coupled to the clock inputs of each of said "D" flip flops.

4. An electronic system, comprising:

a primary serial bus for communicating address bits, data bits and control bits over an information line of said primary serial bus, wherein a block of data bits is followed by a control bit;

a plurality of secondary serial buses;

an expander having a unique address, said expander having a bus port coupled to said primary serial bus, said expander including a plurality of outputs that can be selectively activated;

a controller coupled to said primary serial bus, said controller activating a selected one of the outputs of said expander by transmitting said unique address to the bus port of said expander, followed by the transmission of a predetermined block of data bits to the bus port of said expander;

a bus switch having a bus input coupled to said primary serial bus and a plurality of bus outputs, each of said plurality of secondary serial buses being coupled to a unique one of the bus outputs of said bus switch, said bus switch also having a plurality of control inputs, said primary serial bus being connected to a unique one of said secondary serial buses in response to a unique one of the control inputs being activated; and a plurality of delay circuits, each one of said delay circuits being coupled between a unique one of the outputs of said expander and a unique one of the control inputs of said bus switch, each one of said delay circuits delaying the activation of the corresponding control input of said bus switch until after a control bit has been communicated over said primary serial bus.

5. The electronic system of claim 4, wherein each of said delay circuits includes a "D" flip flop having an input and an output, the input of each flip flop coupled to a unique one of the outputs of said expander circuit, and the output of each of said "D" flip flops being coupled to a unique one of the control inputs of said bus switch.

6. The electronic system of claim 5, wherein:

each of said "D" flip flops includes a clock input;

said primary serial bus also includes a clock line; and said system including combinational logic for logically ANDing said information and clock lines, the output of said combinational logic being coupled to the clock inputs of each of said "D" flip flops.

* * * * *